United States Patent
Sano et al.

(10) Patent No.: US 9,570,744 B2
(45) Date of Patent: Feb. 14, 2017

(54) LITHIUM ION SECONDARY BATTERY

(71) Applicant: TDK CORPORATION, Tokyo (JP)

(72) Inventors: Atsushi Sano, Tokyo (JP); Hiroyuki Miyabara, Tokyo (JP); Yasuhiko Emori, Tokyo (JP)

(73) Assignee: TDK CORPORATION, Tokyo (JP)

( * ) Notice: Subject to any disclaimer, the term of this patent is extended or adjusted under 35 U.S.C. 154(b) by 58 days.

(21) Appl. No.: 14/417,385

(22) PCT Filed: Jul. 25, 2013

(86) PCT No.: PCT/JP2013/070159
§ 371 (c)(1),
(2) Date: Jan. 26, 2015

(87) PCT Pub. No.: WO2014/017583
PCT Pub. Date: Jan. 30, 2014

(65) Prior Publication Data
US 2015/0180034 A1    Jun. 25, 2015

(30) Foreign Application Priority Data
Jul. 26, 2012 (JP) ................. 2012-165988

(51) Int. Cl.
*H01M 4/525* (2010.01)
*H01M 4/131* (2010.01)
*H01M 10/0525* (2010.01)
*H01M 2/02* (2006.01)
*H01M 4/52* (2010.01)
*H01M 4/02* (2006.01)

(52) U.S. Cl.
CPC ........... *H01M 4/525* (2013.01); *H01M 2/0285* (2013.01); *H01M 2/0287* (2013.01); *H01M 4/131* (2013.01); *H01M 4/523* (2013.01); *H01M 10/0525* (2013.01); *H01M 2004/021* (2013.01); *H01M 2004/028* (2013.01); *Y02E 60/122* (2013.01)

(58) Field of Classification Search
CPC ...... H01M 4/525; H01M 4/523; H01M 4/131; H01M 10/0525; H01M 2/0285; H01M 2/0287; H01M 2004/021; H01M 2004/028; Y02E 60/122

See application file for complete search history.

(56) References Cited

U.S. PATENT DOCUMENTS

| 2004/0076883 A1* | 4/2004 | Aoshima ......... H01M 4/525 429/223 |
| 2009/0272940 A1 | 11/2009 | Kikuya et al. |
| 2010/0112449 A1 | 5/2010 | Fujita et al. |

FOREIGN PATENT DOCUMENTS

| CN | 101595581 A | 12/2009 |
| EP | 1391950 A1 | 2/2004 |
| JP | H07-122262 A | 5/1995 |
| JP | 2000-156231 A | 6/2000 |
| JP | 2003-257434 A | 9/2003 |
| JP | 2003-317708 A | 11/2003 |
| JP | 2004-059417 A | 2/2004 |
| JP | 2005-267940 A | 9/2005 |
| JP | 2008-293988 A | 12/2008 |
| WO | 2008120442 A1 | 10/2008 |

OTHER PUBLICATIONS

Norin et al. "Study of membrane degradation in high-power lithium-ion cells"; Electrochemical and Solid-State Letters (2002), 5(4), pp. A67-A69.*

Oct. 15, 2013 Search Report issued in International Patent Application No. PCT/JP2013/070159.

* cited by examiner

*Primary Examiner* — Laura Weiner
(74) *Attorney, Agent, or Firm* — Oliff PLC

(57) ABSTRACT

[Problem] To provide a lithium ion secondary battery having excellent high-rate discharge characteristics. [Solution] Excellent high-rate discharge characteristics are obtained by a lithium ion secondary battery in which a compound represented by $Li_a(Ni_xCo_yAl_{1-x-y})O_2$ (where $0.95 \leq a \leq 1.05$, $0.5 \leq x \leq 0.9$, $0.05 \leq y \leq 0.2$, and $0.7 \leq x+y \leq 1.0$) is used as a positive electrode active material in a positive electrode, the positive electrode has an electrode density of 3.75 to 4.1 $g/cm^3$, and the positive electrode has a BET specific surface area of 1.3 to 3.5 $m^2/g$ as an electrode.

8 Claims, 1 Drawing Sheet

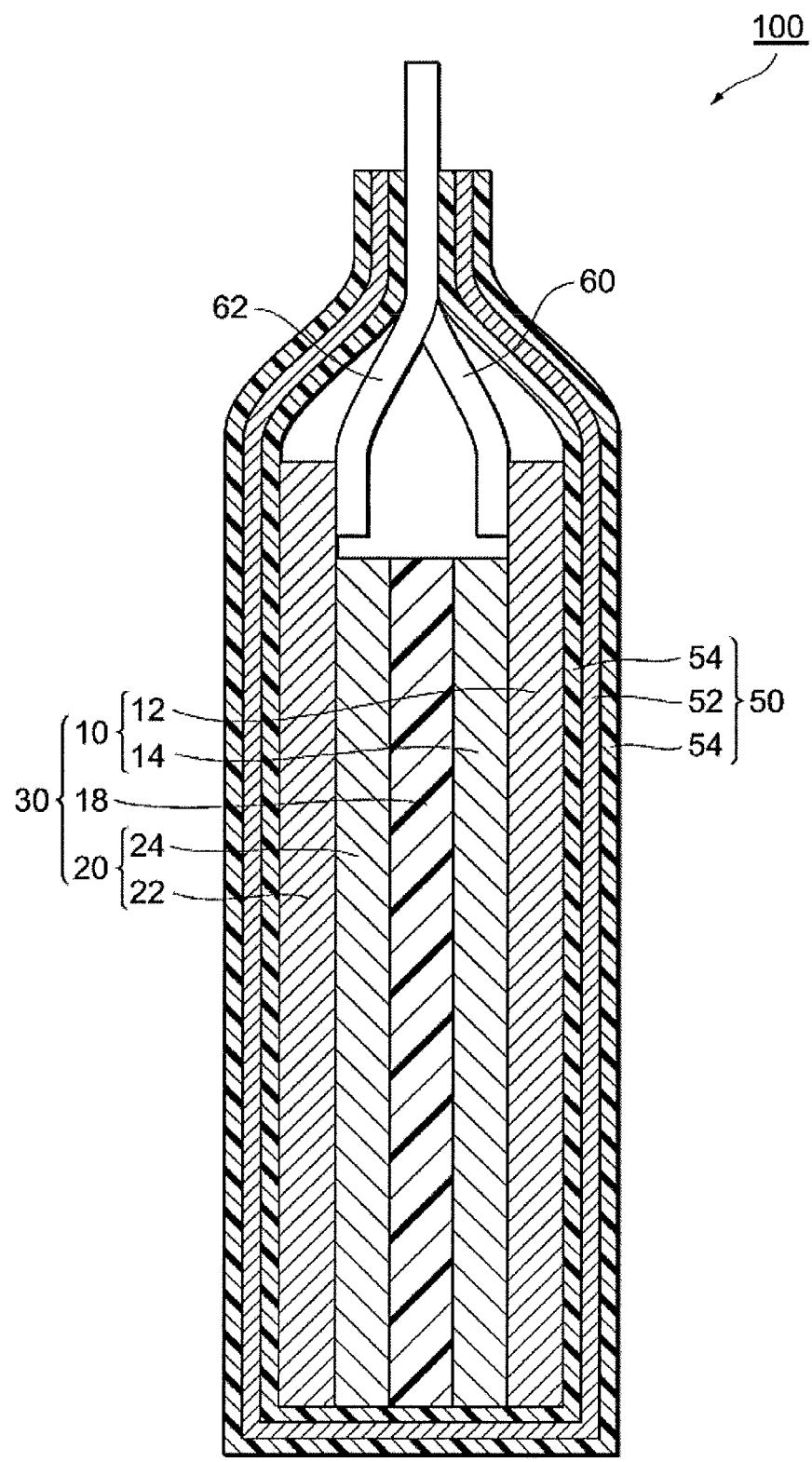

LITHIUM ION SECONDARY BATTERY

TECHNICAL FIELD

The present invention relates to a lithium ion secondary battery.

BACKGROUND ART

A layered compound such as $LiCoO_2$ or $LiNi_{1/3}Mn_{1/3}Co_{1/3}O_2$ or a spinel compound such as $LiMn_2O_4$ has been conventionally used as a positive electrode material (positive electrode active material) for a lithium ion secondary battery. Among the layered compounds, those with high Ni content such as $LiNiO_2$ are known to exhibit high capacity. However, as described in Patent Document 1 and Patent Document 2, a lithium ion secondary battery in which a compound with high Ni content such as $LiNiO_2$ is used has the disadvantage of low theoretical density compared with a Co-containing compound such as $LiCoO_2$, resulting in low energy density as a battery.

The electrode density may be increased by a method such as a roll press. However, when the electrode density is increased as described in Patent Document 3 to achieve higher electrode density, high-rate discharge characteristics may deteriorate.

In the following, the lithium ion secondary battery may be referred to as a "battery".

Patent Document 1: JP-A-2003-257434
Patent Document 2: JP-A-2004-59417
Patent Document 3: JP-A-2008-293988

SUMMARY OF THE INVENTION

Problem to be Solved by the Invention

The present invention has been made in view of the above problem of the conventional technique, and an object of the present invention is to provide a lithium ion secondary battery having excellent high-rate discharge characteristics.

Solution to the Problem

In order to achieve the object, a lithium ion secondary battery according to the present invention includes a positive electrode, a negative electrode, and an electrolyte solution. The positive electrode uses a compound represented by a formula (1) as a positive electrode active material, the positive electrode has an electrode density of 3.75 to 4.1 g/cm³, and the positive electrode has a BET specific surface area of 1.3 to 3.5 m²/g as an electrode:

$$Li_a(Ni_xCo_yAl_{1-x-y})O_2 \quad (1)$$

where $0.95 \le a \le 1.05$, $0.5 \le x \le 0.9$, $0.05 \le y \le 0.2$, and $0.7 \le x+y \le 1.0$.

By the above means, excellent high-rate discharge characteristics can be obtained.

Preferably, in the lithium ion secondary battery according to the present invention, the positive electrode may have a pore volume of 0.005 to 0.02 cm³/g.

More preferably, in the lithium ion secondary battery according to the present invention, the positive electrode may have an electrode active material loaded amount of 20 to 30 mg/cm².

Preferably, in the lithium ion secondary battery according to the present invention, the electrolyte solution may contain a lithium salt, the lithium salt having a salt concentration of 1.1 to 1.7 mol/L.

Preferably, in the lithium ion secondary battery according to the present invention, an aluminum-laminated film may be used as an outer member.

By the above means, excellent high-rate discharge characteristics can be obtained.

Effects of the Invention

By the lithium ion secondary battery according to the present invention, excellent high-rate discharge characteristics can be obtained.

BRIEF DESCRIPTION OF THE DRAWINGS

FIG. 1 is a schematic cross-sectional view of the structure of a lithium ion secondary battery according to the present invention.

DESCRIPTION OF EMBODIMENTS

In the following, a preferred embodiment of the present invention will be described with reference to the drawings. The present invention, however, is not limited to the following embodiment. The constituent elements described below may include elements that may readily occur to those skilled in the art or substantially identical elements. The constituent elements described below may be combined as needed.

(Lithium Ion Secondary Battery)

A lithium ion secondary battery according to the present invention will be briefly described with reference to FIG. 1.

The lithium ion secondary battery includes a positive electrode and a negative electrode which are capable of lithium intercalation and deintercalation, and a separator. The positive electrode, the negative electrode, and the separator are sealed in a case or an outer member, and are impregnated with an electrolyte solution for charging and discharging. The lithium ion secondary battery 100 is mainly provided with a stacked body 30, a case 50 housing the stacked body 30 in a hermetically closed state, and a pair of leads 60 and 62 connected to the stacked body 30.

In the stacked body 30, a pair of the positive electrode 10 and the negative electrode 20 is disposed opposite each other with the separator 18 sandwiched between. The positive electrode 10 includes a positive electrode active material layer 14 disposed on a positive electrode current collector 12. The negative electrode 20 includes a negative electrode active material layer 24 disposed on a negative electrode current collector 22. The positive electrode active material layer 14 and the negative electrode active material layer 24 are respectively in contact with both sides of the separator 18. To the edge parts of the positive electrode current collector 12 and the negative electrode current collector 22, the leads 60 and 62 are respectively connected, the edge parts of the leads 60 and 62 extending to the outside of the case 50.

(Positive Electrode)

The positive electrode 10, as illustrated in FIG. 2, includes the positive electrode current collector 12 that is shaped like a plate (film), and the positive electrode active material layer 14 that is formed on the positive electrode current collector 12.

In the following, the positive electrode 10 according to the present embodiment will be described in detail. The positive electrode 10 of the present embodiment uses a compound represented by the following formula (1) as the positive electrode active material, which has an electrode density of 3.75 to 4.1 g/cm³ and a BET specific surface area of 1.3 to 3.5 m²/g as a positive electrode.

(where $0.95 \leq a \leq 1.05$, $0.5 \leq x \leq 0.9$, $0.05 \leq y \leq 0.2$, and $0.7 \leq x+y \leq 1.0$)

As the positive electrode active material, the compound represented by the composition $Li_a(Ni_xCo_yAl_{1-x-y})O_2$ (where $0.95 \leq a \leq 1.05$, $0.5 \leq x \leq 0.9$, $0.05 \leq y \leq 0.2$, and $0.7 \leq x+y \leq 1.0$) is preferably used in view of large capacity per weight. Particularly, the material in the range of $0.70 \leq x \leq 0.90$ may be more preferable in view of good capacity and rate performance balance.

Use of the positive electrode 10 provides a lithium ion secondary battery having excellent high-rate discharge characteristics presumably due to the following reasons.

When the electrode density is 3.75 to 4.1 g/cm³, it is believed that the contact between the positive electrode active material and a conductive auxiliary agent is improved and electronic conductivity is increased, whereby resistance is decreased and high-rate discharge capacity is increased.

In addition, when the BET specific surface area of the positive electrode 10 is 1.3 to 3.5 m²/g as an electrode, it is believed that higher affinity with the electrolyte is obtained, whereby ion conductivity is increased.

The electrode density can be calculated from the weight of an electrode and the thickness of a coated film. The electrode in this case is a coated film including the active material, the conductive auxiliary agent, and a binder. The electrode weight for calculating the electrode density is the weight of the coated film including the active material from which a volatile component has been removed, the conductive auxiliary agent, and the binder.

The BET specific surface area can be determined by a commonly used method of causing nitrogen adsorption and desorption while varying pressure, and using BET adsorption isotherm equation. The BET specific surface area of the electrode may be measured by cutting a part of the electrode and inserting the electrode into a sample tube.

Preferably, the positive electrode 10 has a pore volume of 0.005 to 0.02 cm³/g, whereby better high-rate discharge characteristics can be obtained.

This is believed due to the following phenomenon. The pores in the positive electrode 10 are impregnated with electrolyte so as to ensure ion conductivity. It is believed that, by ensuring necessary and sufficient pores, excellent high-rate discharge characteristics can be obtained.

The pore volume can be determined based on nitrogen adsorption and desorption. The pore volume determined by this method is believed to be the pore volume of pores of approximately 1,000 Å or smaller.

Preferably, the positive electrode 10 has an electrode active material loaded amount of 20 to 30 mg/cm². When the electrode active material loaded amount is in this range, excellent high-rate discharge characteristics can be obtained.

Examples of the conductive auxiliary agent in the positive electrode 10 include carbons such as carbon blacks, graphites, carbon nanotube (CNT), and vapor grown carbon fiber (VGCF). The carbon blacks may include acetylene black, oil furnace, and Ketjen black. Among these, Ketjen black may preferably be used in view of excellent conductivity. Preferably, one or more types of carbon including carbon blacks, graphites, carbon nanotube (CNT), and vapor grown carbon fiber (VGCF) may be contained. Based on the type and mixture ratio of such conductive auxiliary agent, the specific surface area of the electrode can be adjusted. Preferably, the mixture ratio of the conductive auxiliary agent is 0.5 to 2.5 wt % with respect to the positive electrode as a whole. If the amount of conductive auxiliary agent is too small, electronic conductivity is decreased, resulting in a decrease in rate performance. If the amount of conductive auxiliary agent is too large, binding force with the current collector becomes insufficient.

Examples of the binder for the positive electrode 10 include polyvinylidene fluoride (PVDF), fluorine rubbers based on vinylidene fluoride-hexafluoropropylene (VDF-HFP-based fluorine rubber), vinylidene fluoride-hexafluoropropylene-tetrafluoroethylene-based fluorine rubber (VDF-HFP-TFE-based fluorine rubber), aromatic polyamides, cellulose, styrene-butadiene rubber, isoprene rubber, butadiene rubber, and ethylene-propylene rubber. There may also be used thermoplastic elastomeric polymers, such as styrene-butadiene-styrene block copolymer and its hydrogenated products, styrene-ethylene-butadiene-styrene copolymer, or styrene-isoprene-styrene block copolymer and its hydrogenated products, is added. There may be further used syndiotactic 1,2-polybutadiene, ethylene-vinyl acetate copolymers, or propylene-α-olefin copolymers (having a carbon number of 2 to 12). Preferably, from the viewpoint of increasing electrode density, the polymer used as the binder has a specific weight of greater than 1.2 g/cm³. Also preferably, from the viewpoint of increasing electrode density and enhancing bonding strength, the weight-average molecule weight is 700,000 or more.

Preferably, the content of the binder included in the positive electrode active material layer 14 is 0.5 to 6 mass % with respect to the mass of the active material layer. If the content of the binder is less than 0.5 mass %, the amount of binder is too small, making it more likely that a strong active material layer cannot be formed. If the binder content is more than 6 mass %, the amount of binder that does not contribute to electric capacity increases, making it more likely that sufficient volumetric energy density is difficult to obtain. In this case, if the electronic conductivity of the binder is low, the electric resistance of the active material layer is increased, making it more likely that sufficient electric capacity cannot be obtained.

The above-described active material is mixed with a required amount of the conductive auxiliary agent. By adjusting the degree of dispersion when the active material and the conductive auxiliary agent are mixed, the specific surface area of the electrode can be adjusted. Specifically, when the active material and the conductive auxiliary agent are mixed, the specific surface area of the electrode can be adjusted by varying the mixed state of the active material and the conductive auxiliary agent by using, e.g., a dry ball mill, an air-flow pulverizer, a dry pulverizer, or a wet pulverizer. To the mixture of the active material and the conductive auxiliary agent, solvent is added to prepare a slurry. As the solvent, N-methyl-2-pyrrolidone, N,N-dimethylformamide or the like may be used. The amount of the mixed solvent may be adjusted to carry out a thick mixing step referred to as kneading. By adjusting the solid content concentration and kneading time during kneading, the pore volume can be adjusted. This is believed due to the difference in how the active material, the conductive auxiliary agent, and the binder are compounded depending on the solid content concentration and kneading time during kneading.

The positive electrode current collector 12 may be a conductive plate material, such as, for example, a metal thin plate of aluminum, copper, or nickel foil.

<Positive Electrode Manufacturing Method>

A method of manufacturing the electrode according to the present embodiment includes a slurry fabrication step, an electrode coating step, and a pressing step.

[Slurry Fabrication Step]

(Raw Material Mixture)

In the slurry fabrication step, first, a raw material mixture is prepared. The raw material mixture includes $Li_a(Ni_x Co_y Al_{1-x-y})O_2$ as the positive electrode active material (where $0.95 \leq a \leq 1.05$, $0.5 \leq x \leq 0.9$, $0.05 \leq y \leq 0.2$, $0.7 \leq x+y \leq 1.0$), the conductive auxiliary agent, and the binder. Preferably, the BET specific surface area of the positive electrode active material is in the range of 0.3 to 1.0. The material in this range has high discharge capacity and excellent high-rate discharge characteristics. Preferably, the mixture ratio of the active material is 93 to 98.5 wt % with respect to the positive electrode as a whole, in view of electrode density and rate performance.

[Electrode Fabrication Step]

The slurry of which the viscosity has been adjusted after kneading can be coated by a method selected as needed from methods such as a doctor blade, a slot die, a nozzle, or a gravure roll. By adjusting the amount of coating or line speed, the amount of positive electrode loading can be adjusted such that the positive electrode active material has a loaded amount of 20 to 30 mg/cm$^2$. After coating, drying is performed. While the drying method is not particularly limited, the pore volume of the electrode can be adjusted by the drying speed.

[Pressing Step]

The electrode that has been coated and dried is pressed using a roll press. By heating the rolls and softening the binder, a higher electrode density can be obtained. Preferably, the roll temperature is in the range of 100° C. to 200° C. Depending on the roll press pressure, gap between rolls, and the roll temperature, and by adjusting the surface roughness of the roll surface, the specific surface area of the electrode can be adjusted.

By using the positive electrode 10 obtained as described above as a lithium ion secondary battery electrode, high high-rate discharge characteristics can be obtained.

(Negative Electrode)

The negative electrode 20 includes the plate-like negative electrode current collector 22, and the negative electrode active material layer 24 formed on the negative electrode current collector 22. The negative electrode current collector 22, the binder, and the conductive auxiliary agent may be the same as those of the positive electrode. The negative electrode active material is not particularly limited, and a well-known negative electrode active material for battery may be used. As the negative electrode active material, examples include: particles including carbon material capable of intercalating and deintercalating lithium ions (intercalation/deintercalation or doping/dedoping) such as graphite, hard carbon, soft carbon, or low temperature heat-treated carbon; metals that can combine with lithium such as Al, Si, or Sn; an amorphous compound mainly of an oxide such as SiO, $SiO_2$, or $SnO_2$; and lithium titanate ($Li_4Ti_5O_{12}$). Among these, it is preferable to use SiO which has high acceptance for lithium ions from the positive electrode, so as to enhance high-rate discharge characteristics.

(Electrolyte Solution)

The electrolyte solution is contained within the positive electrode active material layer 14, the negative electrode active material layer 24, and the separator 18. The electrolyte solution is not particularly limited. According to the present embodiment, an electrolyte solution containing lithium salt (electrolyte aqueous solution or electrolyte solution using organic solvent) may be used. However, because the electrolyte aqueous solution has low decomposition voltage electrochemically, the withstand voltage at the time of charging is limited to be low. Thus, the electrolyte solution that uses organic solvent (non-aqueous electrolytic solution) is preferable. As the electrolyte solution, lithium salt dissolved in a non-aqueous solvent (organic solvent) may be preferably used. As the lithium salt, there may be used, for example, salts such as $LiPF_6$, $LiClO_4$, $LiBF_4$, $LiAsF_6$, $LiCF_3SO_3$, $LiCF_3$, $CF_2SO_3$, $LiC(CF_3SO_2)_3$, $LiN(CF_3SO_2)_2$, $LiN(CF_3CF_2SO_2)_2$, $LiN(CF_3SO_2)(C_4F_9SO_2)$, $LiN(CF_3CF_2CO)_2$, and LiBOB. Such salts may be used either individually or in combination of two or more kinds.

Preferably, the lithium salt in the electrolyte has a salt concentration of 1.1 to 1.7 mol/L. When the salt concentration is in this range, it is believed that the lithium salt can be uniformly distributed in the positive electrode pores, providing excellent high-rate performance. If the salt concentration of the lithium salt is lower than 1.1 mol/L, the overvoltage necessary for lithium ion migration is increased, whereby, it is believed, in the case of constant current, polarization appears large and the high-rate discharge characteristics deteriorate. If the lithium salt concentration is greater than 1.7 mol/L, the electrolyte viscosity is increased, whereby, it is believed, the lithium salt does not permeate the positive electrode pores sufficiently.

As the organic solvent, preferable examples include propylene carbonate, ethylene carbonate, and diethyl carbonate. These may be used either individually or in combination of two or more kinds mixed in an appropriate ratio.

In the present embodiment, the electrolyte solution may not be in liquid form and may include a gel electrolyte obtained by adding a gelling agent. Instead of the electrolyte solution, a solid electrolyte (a solid polymer electrolyte or an electrolyte made from ion conductive inorganic material) may be contained.

The separator 18 is an electrically insulating porous body, such as, for example, a single layer body or a stacked body of a polyethylene, polypropylene, or polyolefin film, an extended film of a mixture of the resins, or a fibrous nonwoven fabric made of at least one constituent material selected from the group consisting of cellulose, polyester, and polypropylene.

The case 50 is configured to hermetically seal the stacked body 30 and the electrolyte therein. The case 50 is not particularly limited as long as the case can prevent external electrolyte leakage and entry of external moisture and the like into the electrochemical device 100. For example, as the case 50, as illustrated in FIG. 1, a metal laminate film of the metal foil 52 coated on both sides with the polymer films 54 may be utilized. The case 50 may also be referred to as an outer member. When the metal laminate film is used in the outer member, a lithium ion secondary battery having excellent high-rate discharge characteristics can be obtained. The reason for this is not clear. It is inferred, however, that the excellent high-rate discharge characteristics are obtained because the metal laminate film conforms to the expansion and contraction of the electrode and does not block the movement of lithium ions as the electrode is expanded or contracted when the lithium ions are intercalated in the electrode. As the metal foil 52, an aluminum foil may be utilized. As the polymer film 54, a film of polypropylene or the like may be utilized. For example, as the material for the outer polymer film 54, a polymer having a high melting point such as polyethylene terephthalate (PET) or polyamide, is preferable. As the material for the inner polymer film 54, polyethylene, polypropylene or the like is preferable.

The leads 60 and 62 are formed from a conductive material such as aluminum.

By a well-known method, the leads 60 and 62 are respectively welded to the positive electrode current collector 12 and the negative electrode current collector 22. Then, with the separator 18 sandwiched between the positive electrode active material layer 14 of the positive electrode 10 and the negative electrode active material layer 24 of the negative electrode 20, the electrodes are inserted into the case 50 together with the electrolyte, and the entry of the case 50 is sealed.

EXAMPLES

In the following, the present invention will be described in more concrete terms with reference to Examples and Comparative Examples. However, the present invention is not limited to the following examples.

Example 1

Fabrication of Evaluation Cell $Li_{1.03}(Ni_{0.85}Co_{0.1}Al_{0.05})O_2$ and Ketjen black were mixed in a ball mill for one hour. Polyvinylidene fluoride (PVdF) was then added, and the mixing was performed so as to obtain a weight ratio of $Li_{1.03}(Ni_{0.85}Co_{0.1}Al_{0.05})O_2$:Ketjen black:PVdF=96:2:2. N-methyl-2-pyrrolidone (NMP) was added as the solvent, preparing a slurry. Thick mixing was performed for one hour, followed by the addition of NMP so as to adjust the viscosity to 5,000 cPs. Doctor blade method was used for coating on the aluminum foil serving as the current collector, followed by drying at 100° C. for 10 minutes. Thereafter, pressing was performed using a roll press heated to 100° C. at a linear pressure of 1 t $cm^{-1}$, fabricating the positive electrode. Adjustments were made such that the active material loaded amount of the positive electrode was 23 $mg/cm^2$ and the electrode density was 2.2 $g/cm^3$.

Then, for the negative electrode, a complex of silicon oxide and silicon, acetylene black, and an N-methylpyrrolidone (NMP) solution of polyimide resin were mixed such that the ratio of the complex of silicon oxide and silicon: acetylene black:polyimide resin=70:10:20, fabricating a slurry paint. The paint was coated onto the copper foil serving as the current collector, which was then dried and pressed, fabricating the negative electrode.

The positive electrode and the negative electrode were stacked with the separator made of a microporous polyethylene film sandwiched therebetween, obtaining a stacked body (element body). The stacked body was placed in an aluminum laminate pack. For the electrolyte, ethylene carbonate (EC) and diethyl carbonate (DEC) were mixed at a volume ratio of 3:7, and $LiPF_6$ was dissolved as a support salt until 1.5 mol/L.

The electrolyte was injected into the aluminum laminate pack containing the stacked body and then vacuum-sealed, fabricating an evaluation cell according to Example 1.

Examples 2 to 5

Evaluation cells according to Examples 2 to 5 were fabricated by the same method as in Example 1 with the exception that the electrode density, the electrode BET specific surface area, and the pore volume were modified by varying the electrode pressing pressure, the mixture of the active material and the conductive auxiliary agent, and slurry kneading.

Examples 6 to 8, 16, and 17

Evaluation cells according to Examples 6 to 8, 14, and 15 were fabricated by the same method as in Example 3 with the exception that the lithium salt concentration was modified.

Examples 12 to 15

Evaluation cells according to Examples 12 and 13 were fabricated by the same method as in Example 2 with the exception that the electrode BET specific surface area and pore volume were modified by varying the mixture of the active material and the conductive auxiliary agent and slurry kneading.

Examples 9 to 11, and 18 to 21

Evaluation cells according to Examples 9 to 11, and 16 to 19 were fabricated by the same method as in Example 2 with the exception that the positive electrode loaded amount, the electrode density, the electrode BET specific surface area, and the pore volume were modified by varying the coating amount, the electrode pressing pressure, the mixture of the active material and the conductive auxiliary agent, and slurry kneading.

Example 22

An evaluation cell according to Example 22 was fabricated in the same way as in Example 1 with the exception that the negative electrode was fabricated by mixing a complex of silicon oxide and silicon and graphite at a weight ratio of 1:9 to prepare the negative electrode active material, mixing the negative electrode active material, acetylene black, and a N-methylpyrrolidone (NMP) solution of polyimide resin at the ratio of the negative electrode active material:acetylene black:polyimide resin=85:5:10 to fabricate a slurry paint, and then coating the paint onto a copper foil serving as the current collector, followed by drying and pressing.

Example 23

An evaluation cell according to Example 23 was fabricated in the same way as in Example 1 with the exception that the negative electrode was fabricated by using graphite as the negative electrode active material, mixing the graphite with acetylene black and a PVdF solution at the ratio of graphite:acetylene black:PVdF=92:2:6 to fabricate a slurry paint, and then coating the paint onto a copper foil serving as the current collector, followed by drying and pressing.

Example 24

An evaluation cell according to Example 24 was fabricated in the same way as in Example 3 with the exception that $Li_{1.03}(Ni_{0.9}Co_{0.07}Al_{0.03})O_2$ was used as the positive electrode active material.

Example 25

An evaluation cell according to Example 25 was fabricated in the same way as in Example 3 with the exception that $Li_{1.03}(Ni_{0.8}Co_{0.15}Al_{0.05})O_2$ was used as the positive electrode active material.

Example 26

An evaluation cell according to Example 26 was fabricated in the same way as in Example 3 with the exception that $Li_{1.03}(Ni_{0.7}Co_{0.2}Al_{0.1})O_2$ was used as the positive electrode active material.

Comparative Examples 1 to 4

Evaluation cells according to Comparative Examples 1 to 4 were fabricated by the same method as in Example 1 with the exception that the electrode density, the electrode BET specific surface area, and the pore volume were modified by varying the electrode pressing pressure, the mixture of the active material and the conductive auxiliary agent, and slurry kneading.

Comparative Example 5

An evaluation cell according to Comparative Example 5 was fabricated in the same way as in Example 3 with the exception that $Li_{1.03}(Ni_{0.4}Co_{0.55}Al_{0.05})O_2$ was used as the positive electrode active material.

Comparative Example 6

An evaluation cell according to Comparative Example 6 was fabricated in the same way as in Example 3 with the exception that $Li_{1.03}(Ni_{0.95}Co_{0.03}Al_{0.02})O_2$ was used as the positive electrode active material.

Comparative Example 7

An evaluation cell according to Comparative Example 7 was fabricated in the same way as in Example 3 with the exception that $Li_{1.03}(Ni_{0.5}Co_{0.45}Al_{0.05})O_2$ was used as the positive electrode active material.

[Rate Performance Evaluation]

The respective rate performance (unit: %) of Example 1 was obtained. The rate performance refers to the discharge capacity ratio at 1 C when the discharge capacity at 0.1 C is 100%. The results are shown in Table 1. While the greater the rate performance, the better, it was determined that rate performance of 75% or more was preferable.

It can be seen from the results of Examples 1 to 5 and Comparative Examples 1 and 2 in Table 1 that excellent rate performance is obtained when the composition of the positive electrode active material $Li_a(Ni_xCo_yAl_{1-x-y})O_2$ is in the range of $1.00 \leq a \leq 1.03$, $0.70 \leq x \leq 0.90$, and $0.07 \leq y \leq 0.2$, the electrode density is 3.75 to 4.1 g/cm³, and the BET specific surface area of the positive electrode is 1.3 to 3.5 m²/g as an electrode. It can also be seen from the results of Examples 6 to 8, 13, and 14 that more excellent characteristics are exhibited when the salt concentration of the lithium salt is 1.1 to 1.7 mol/L. It can also be seen from the results of Examples 9 to 11, 15, and 16 that particularly excellent rate performance is exhibited when the electrode active material loaded amount is 20 to 30 mg/cm².

TABLE 1

| | Active material loaded amount (mg/cm2) | Current density (g/cm3) | Electrode BET specific surface area (m2/g) | Pore volume (cm3/g × 10−3) | Lithium salt concentration (mol/L) | Rate perfonnance (1 C/0.1 C × 100) |
|---|---|---|---|---|---|---|
| Example 1 | 23 | 3.75 | 2.2 | 6.70 | 1.50 | 87.5 |
| Example 2 | 23 | 3.85 | 2.3 | 9.70 | 1.50 | 88.2 |
| Example 3 | 23 | 3.95 | 1.8 | 13.50 | 1.50 | 89.5 |
| Example 4 | 23 | 4.03 | 1.4 | 6.10 | 1.50 | 88.6 |
| Example 5 | 23 | 4.10 | 1.3 | 5.60 | 1.50 | 87.2 |
| Example 6 | 23 | 4.10 | 1.3 | 13.50 | 1.15 | 87.1 |
| Example 7 | 23 | 4.10 | 1.3 | 13.50 | 1.30 | 88.4 |
| Example 8 | 23 | 4.10 | 1.3 | 13.50 | 1.65 | 88.5 |
| Example 9 | 20 | 3.75 | 2.1 | 8.50 | 1.50 | 86.5 |
| Example 10 | 25 | 3.95 | 1.8 | 8.10 | 1.50 | 89.9 |
| Example 11 | 30 | 3.75 | 1.8 | 7.20 | 1.50 | 86.8 |
| Example 12 | 23 | 3.75 | 1.3 | 4.80 | 1.50 | 79.1 |
| Example 13 | 23 | 3.75 | 1.3 | 20.00 | 1.50 | 78.6 |
| Example 14 | 23 | 3.95 | 1.8 | 8.00 | 1.50 | 90.1 |
| Example 15 | 23 | 3.95 | 1.8 | 10.00 | 1.50 | 90.8 |
| Example 16 | 23 | 4.10 | 1.3 | 13.50 | 1.00 | 80.9 |
| Example 17 | 23 | 4.10 | 1.3 | 13.50 | 1.75 | 78.3 |
| Example 18 | 18 | 3.75 | 1.4 | 5.00 | 1.50 | 80.3 |
| Example 19 | 33 | 3.75 | 1.3 | 4.90 | 1.50 | 78.3 |
| Example 20 | 23 | 4.10 | 2.8 | 11.30 | 1.50 | 83.1 |
| Example 21 | 23 | 4.10 | 3.5 | 12.50 | 1.50 | 81.2 |
| Example 22 | 23 | 3.75 | 2.2 | 6.70 | 1.50 | 84.1 |
| Example 23 | 23 | 3.75 | 2.2 | 6.70 | 1.50 | 79.2 |
| Example 24 | 23 | 3.95 | 1.8 | 13.50 | 1.50 | 88.7 |
| Example 25 | 23 | 3.95 | 1.8 | 13.50 | 1.50 | 80.1 |
| Example 26 | 23 | 3.95 | 1.8 | 13.50 | 1.50 | 78.5 |
| Comparative Example 1 | 23 | 3.50 | 1.2 | 4.80 | 1.50 | 73.1 |
| Comparative Example 2 | 23 | 4.12 | 1.1 | 4.90 | 1.50 | 74.5 |
| Comparative Example 3 | 23 | 3.85 | 1.0 | 5.20 | 1.50 | 72.2 |
| Comparative Example 4 | 23 | 3.95 | 4.5 | 13.90 | 1.50 | 73.8 |
| Comparative Example 5 | 23 | 3.95 | 1.8 | 13.50 | 1.50 | 73.2 |
| Comparative Example 6 | 23 | 3.95 | 1.8 | 13.50 | 1.50 | 75.2 |
| Comparative Example 7 | 23 | 3.95 | 1.8 | 13.50 | 1.50 | 75.9 |

DESCRIPTION OF REFERENCE SIGNS

10 Positive electrode
20 Negative electrode
12 Positive electrode current collector
14 Positive electrode active material layer
18 Separator
22 Negative electrode current collector
24 Negative electrode active material layer
30 Stacked body
50 Case
60, 62 Lead
100 Lithium ion secondary battery

The invention claimed is:

1. A lithium ion secondary battery comprising:
a positive electrode:
a negative electrode; and
an electrolyte solution, wherein
the positive electrode uses a compound represented by a formula (1) as a positive electrode active material,
the positive electrode has an electrode density of 3.75 to 4.10 g/cm³,
the positive electrode has a positive electrode active material amount of 20 to 30 mg/cm²,
the positive electrode has a pore volume of 0.005 to 0.02 cm³/g, and
the positive electrode has a BET specific surface area of 1.3 to 3.5 m²/g as an electrode:

$$Li_a(Ni_xCo_yAl_{1-x-y})O_2 \tag{1}$$

where $0.95 \leq a \leq 1.05$, $0.5 \leq x \leq 0.9$, $0.05 \leq y \leq 0.2$, and $0.7 \leq x+y \leq 1.0$.

2. The lithium ion secondary battery according to claim 1, wherein the positive electrode has a positive electrode active material amount of 20 to 30 mg/cm².

3. The lithium ion secondary battery according to claim 2, wherein the electrolyte solution contains a lithium salt, the lithium salt having a salt concentration of 1.1 to 1.7 mol/L.

4. The lithium ion secondary battery according to claim 3, wherein an aluminum-laminated film is used as an outer member.

5. The lithium ion secondary battery according to claim 2, wherein an aluminum-laminated film is used as an outer member.

6. The lithium ion secondary battery according to claim 1, wherein the electrolyte solution contains a lithium salt, the lithium salt having a salt concentration of 1.1 to 1.7 mol/L.

7. The lithium ion secondary battery according to claim 6, wherein an aluminum-laminated film is used as an outer member.

8. The lithium ion secondary battery according to claim 1, wherein an aluminum-laminated film is used as an outer member.

* * * * *